United States Patent [19]

Leining et al.

[11] 4,351,088

[45] Sep. 28, 1982

[54] METHOD AND APPARATUS FOR REMOVING SKIN FROM ANIMAL CARCASSES

[75] Inventors: Lyndon R. Leining; Nathan A. Fischer; Kent L. Simonson; Gordon G. White; Oscar H. Lindstrom, all of Austin, Minn.

[73] Assignee: Geo. A. Hormel & Company, Austin, Minn.

[21] Appl. No.: 43,041

[22] Filed: May 29, 1979

Related U.S. Application Data

[63] Continuation-in-part of Ser. No. 887,728, Mar. 17, 1978, abandoned.

[51] Int. Cl.³ .................... A22B 5/16; A22C 17/12
[52] U.S. Cl. ................................. 17/50; 17/21; 99/589
[58] Field of Search ............... 17/21, 50, 62; 99/587, 99/588, 589

[56] References Cited

U.S. PATENT DOCUMENTS 3,308,502   3/1967   Bednarz et al. ................. 17/21
4,025,986   5/1977   Koken ............................. 17/21
4,084,292   4/1978   Harlan et al. ................. 17/21 X

*Primary Examiner*—Willie G. Abercrombie
*Attorney, Agent, or Firm*—Williamson, Bains, Moore & Hansen

[57] ABSTRACT

An apparatus and method for removing the torso portion of the skin from the carcass of an animal, such as a hog, includes an overhead support from which a carcass is suspended during the skin removing operation. The skin is first removed from the hind quarters of the carcass and then a cut is made in the skin of the torso completely around the carcass just rearwardly of the fore limbs. A flap forming blade makes a longitudinal cut in the carcass and the longitudinal edge of the skin defined by the longitudinal cut is gripped by revolvable toothed cylinders carried by a revolvable drum to form a flap which is wound about the toothed cylinder. A carcass engaging device holds the carcass against the drum during the flap forming operation. A flexible pressurized movable blade positioned adjacent the drum progressively cuts the skin from the carcass as the drum is revolved.

17 Claims, 12 Drawing Figures

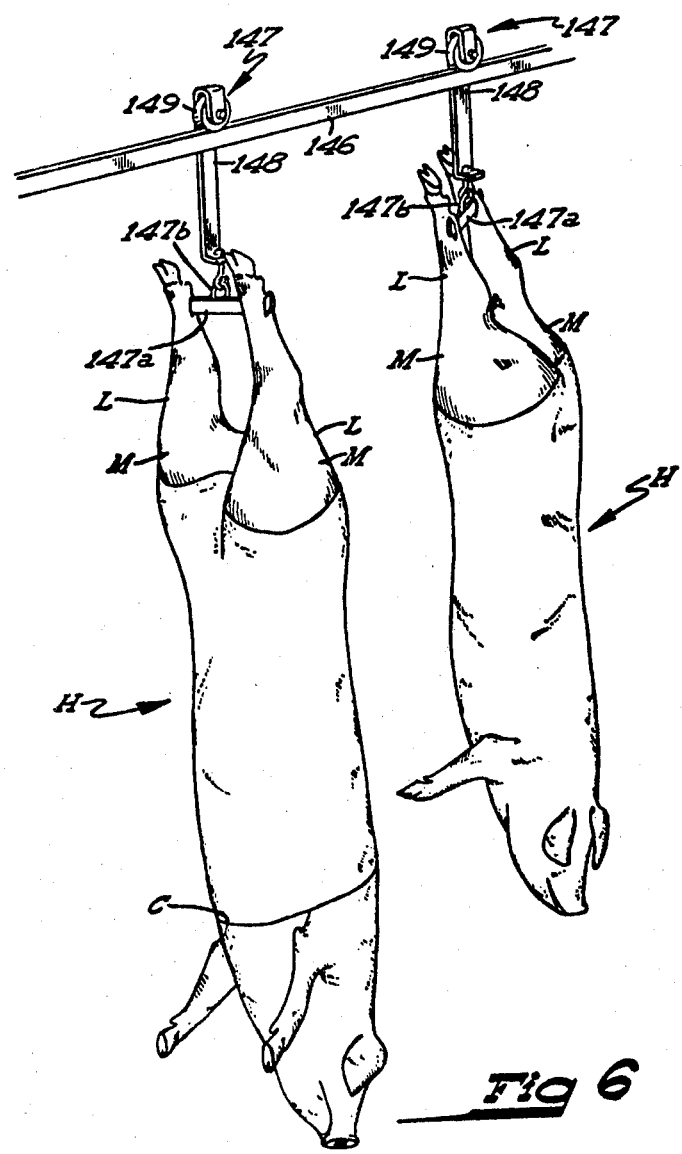

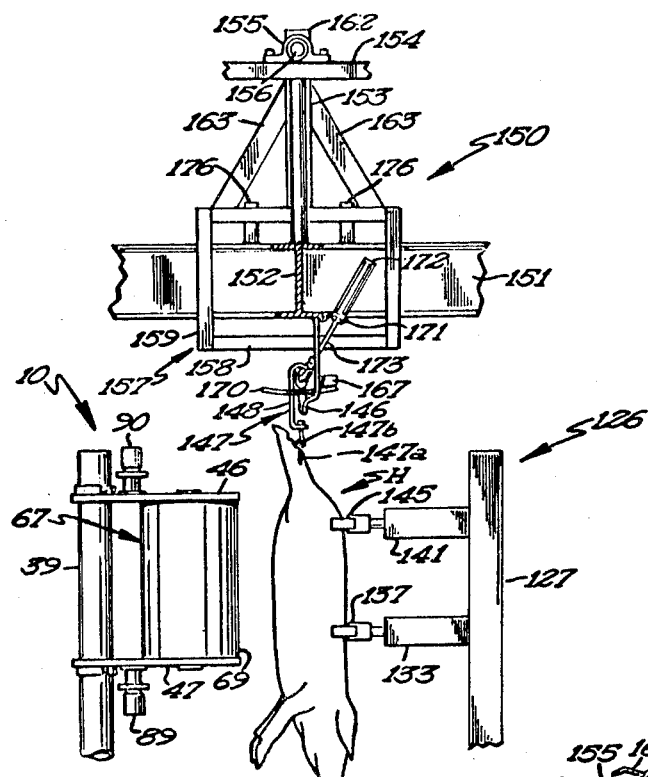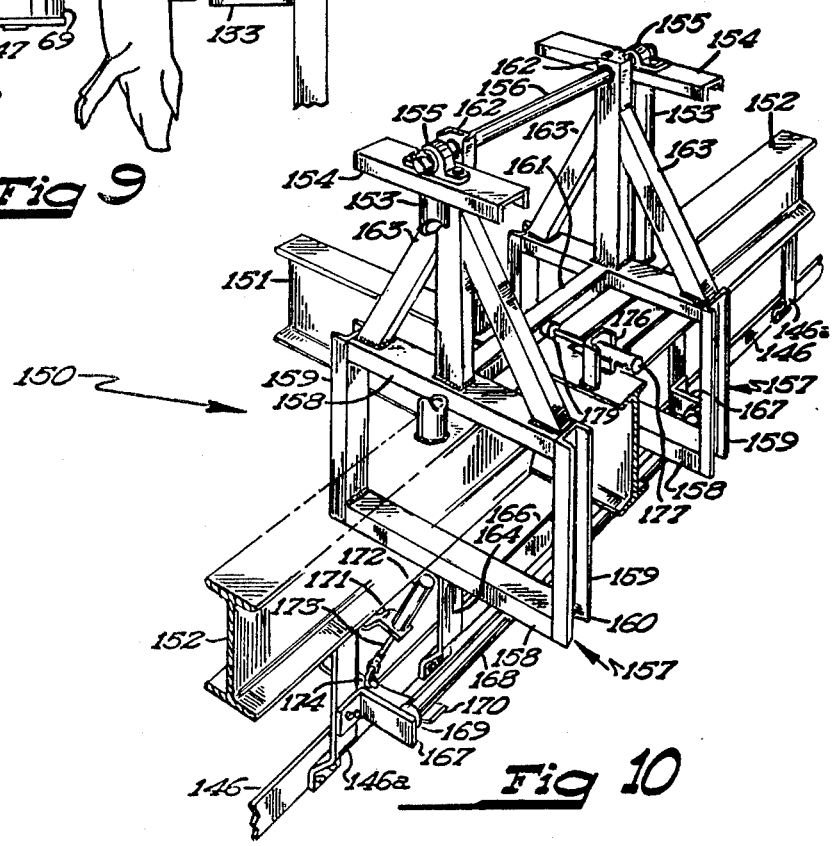

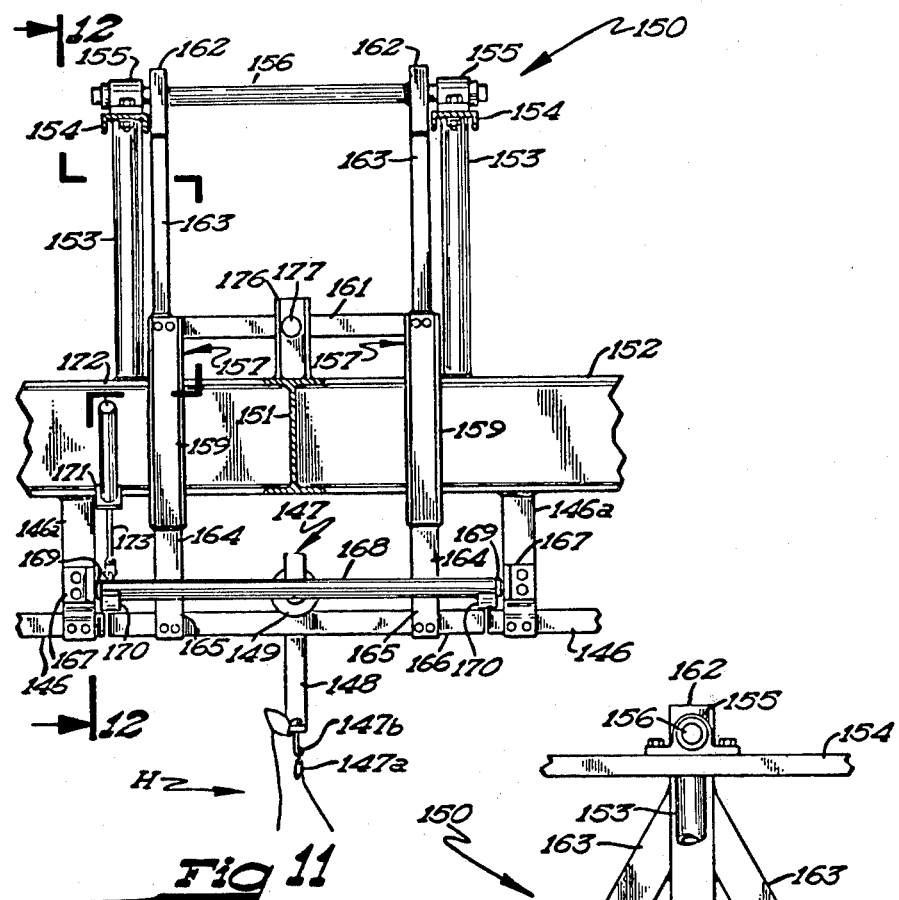
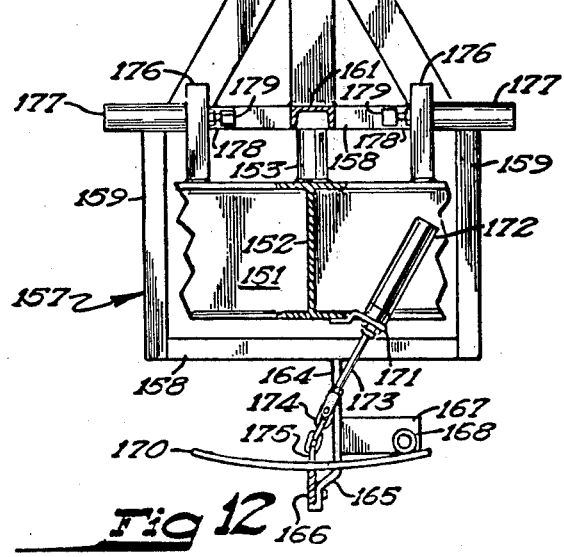

4,351,088

METHOD AND APPARATUS FOR REMOVING SKIN FROM ANIMAL CARCASSES

This is a continuation of application Ser. No 887,728, filed Mar. 17, 1978, now abandoned.

SUMMARY OF THE INVENTION

This invention relates to a method and apparatus for removing the torso portion of the skin from the carcass of an animal, such as a hog.

In many commercial meat packing operations, the skin is usually removed from the animal carcass by pulling, or in some instances, the animal is butchered and the skin is thereafter removed from the primal cuts. However, when the skin is pulled from the carcass, a substantial amount of fat is sometimes removed with the skin. The fat must then be removed from the skin. Further, removal of the skin from primal cuts involves time consuming operations and involves the use of costly equipment.

It is therefore an object of this invention to provide a novel method and apparatus for removing the torso portion of the skin from the carcass of an animal wherein there is a minimum amount of fat on the skin and wherein the torso portion is removed as one piece.

More specifically, the apparatus is operable to cut the torso portion of the animal skin and form a flap which is gripped by a drum device which then rotates the carcass against a flexible, pressurized movable blade the latter progressively removing the skin from the carcass.

In carrying out the novel method, the skin of the hind quarters is first removed from the suspended carcass, thereafter a cut is then made in the skin just rearwardly of the fore limbs completely around the carcass, and finally, the entire torso portion of the skin of the animal carcass is removed by the action of a rotating drum which rotates the carcass against a flexible, pressurized movable knife to progressively remove the skin from the carcass.

These and other objects and advantages of this invention will more fully appear from the following description made in connection with the accompanying drawings wherein like reference characters refer to the same or similar parts throughout the several views.

FIGURES OF THE DRAWINGS

FIG. 6 is a diagrammatic perspective view of suspended animal carcasses illustrating the initial skin removing steps;

FIG. 9 is a diagrammatic end elevational view of the movable rail device illustrating the relationship through to the revolving drum and the carcass engaging device.

FIG. 10 is a perspective view of the movable rail device;

FIG. 11 is a cross-sectional view taken approximately along line 11—11 of FIG. 10 and looking in the direction of the arrows; and FIG. 12 is a cross-sectional view taken approximately along line 12—12 of FIG. 11 and looking in the direction of the arrows.

DESCRIPTION OF THE PREFERRED EMBODIMENT

Figure 1:
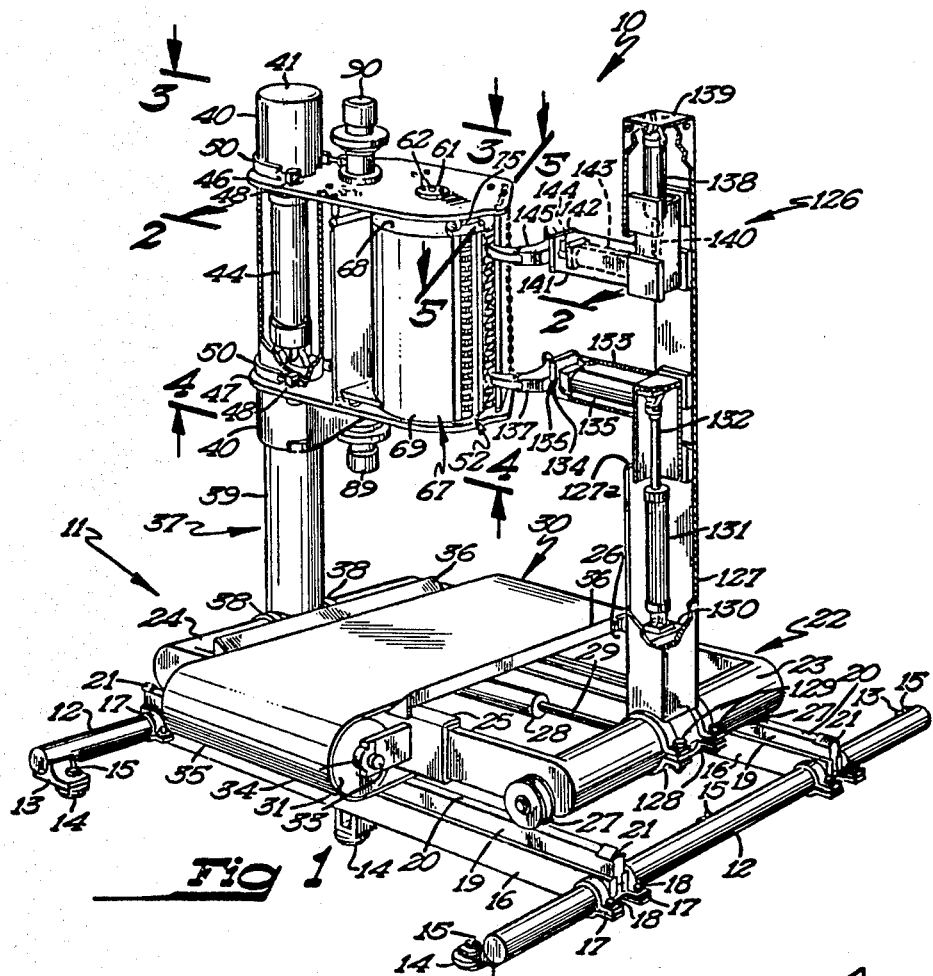
FIG. 1 is a perspective view of a major portion of the novel apparatus used in carrying out the novel method with certain parts thereof broken away for clarity.

Referring now to the drawings and more specifically to FIG. 1, it will be seen that one embodiment of the novel skin removing apparatus, designated generally by the reference numeral 10 is thereshown. The skin removing apparatus includes a base 11 which is comprised of a pair of elongate longitudinal tubular frame members 12 each having a plurality of brackets 13 secured thereto. Each bracket has a foot pad 14 secured thereto by means of a bolt 15.

The base 11 also includes a plurality of elongate transverse frame members 16 which are generally of rectangular configuration and each has arcuate recesses in the end portions thereof for mating contact with the external surface of the longitudinal frame members 12. It will be noted that the transverse frame members 16 are arranged in closely spaced apart pairs and each frame member has a pair of split ring elements 17 secured to opposite ends thereof as by welding. The split ring elements 17 engage the exterior surface of the longitudinal frame members 12 and are clamped thereagainst by bolts 18.

A pair of longitudinally spaced apart substantially parallel track members 19 are provided each being rigidly secured to a pair of the transverse frame members 16. It will be noted that each track member 19 has a convex pointed upper surface 20 whose sides slope downwardly away from the apex. Each track member is also provided with a pair of stop elements 21, each stop element being secured to opposite ends of the associated track member.

A carriage device 22 is mounted on the base 11 and includes an elongate generally cylindrically shaped longitudinal support member 23 and a cylindrical longitudinal support member 24. The longitudinal support member 24 has a pair of rectangular shaped hollow transverse support members 25 secured to the opposite ends thereof and projecting transversely therefrom. The longitudinal support member 23 also has a pair of generally rectangular shaped transverse support member 26 secured to opposite ends thereof and projecting transversely therefrom, the support members 26 telescoping into the support members 25.

The carriage 22 is provided with a plurality of track engaging rollers 27 each being secured to one end of the longitudinal support members 23 and 24. The track engaging rollers 27 are rollable along the upper surface of the track members 19.

A double acting hydraulic cylinder 28 is connected to the mid-portion of the longitudinal members 24 and has a piston movable therein to which is connected a piston rod 29. The piston rod 29 is connected to the mid-portion of the support member 23. The hydraulic cylinder 28 is connected to a source of hydraulic fluid under pressure and extension and retraction of the piston rod 29 produces relative shifting movement of the longitudinal support members relative to each other.

A conveyor device 30 is also mounted on the base 11 and includes a pair of similar conveyor rolls 31 each being mounted adjacent but outwardly of one of the support members 25. In this respect, each of the transverse support members 25 has a pair of transversely spaced apart brackets 32 mounted thereon and the axle 33 of the conveyor rolls 31 are journaled in bearings 34 carried by the brackets 32. An endless conveyor belt or apron 35 is trained about the conveyor rolls 31, and it is pointed out that one of the conveyor rolls is driven by suitable hydraulic or electric motor. The conveyor device also includes a pair of elongate inclined ramps 36 each mounted on the upper surface of the transverse support members 25 and each extending in substantially parallel relation with respect to the longitudinal frame members 12 of the base 11.

A vertical support 37 is also mounted on the base 11 and includes a cylindrical lower vertical support member 39 having a pair of split ring clamps 38 secured thereto. The split ring clamps 38 clampingly engage the longitudinal support member 24 of the base 11. It will be noted that the vertical support 37 is clamped to the longitudinal support member 24 midway of the latter. A cylindrical upper vertical support member 40 having a cap 41 on its upper end is telescopically positioned upon the lower support member 39 and is vertically shiftable relative thereto. An inner support post 42 is positioned within the lower support member 39 and is rigidly secured thereto and is provided with a flange 43 at its upper end. A double acting hydraulic cylinder 44 is mounted on the flange 43 and extends vertically upwardly therefrom. The cylinder 44 has a piston movable therein to which is connected a piston rod 45 which in turn is connected to the lower surface of the cap 41. The hydraulic cylinder 44 is connected to a source of hydraulic fluid under pressure, and extension and retraction of the piston rod 45 causes vertical shifting of the upper vertical support member 40 relative to the lower vertical support member 39.

Figure 2:
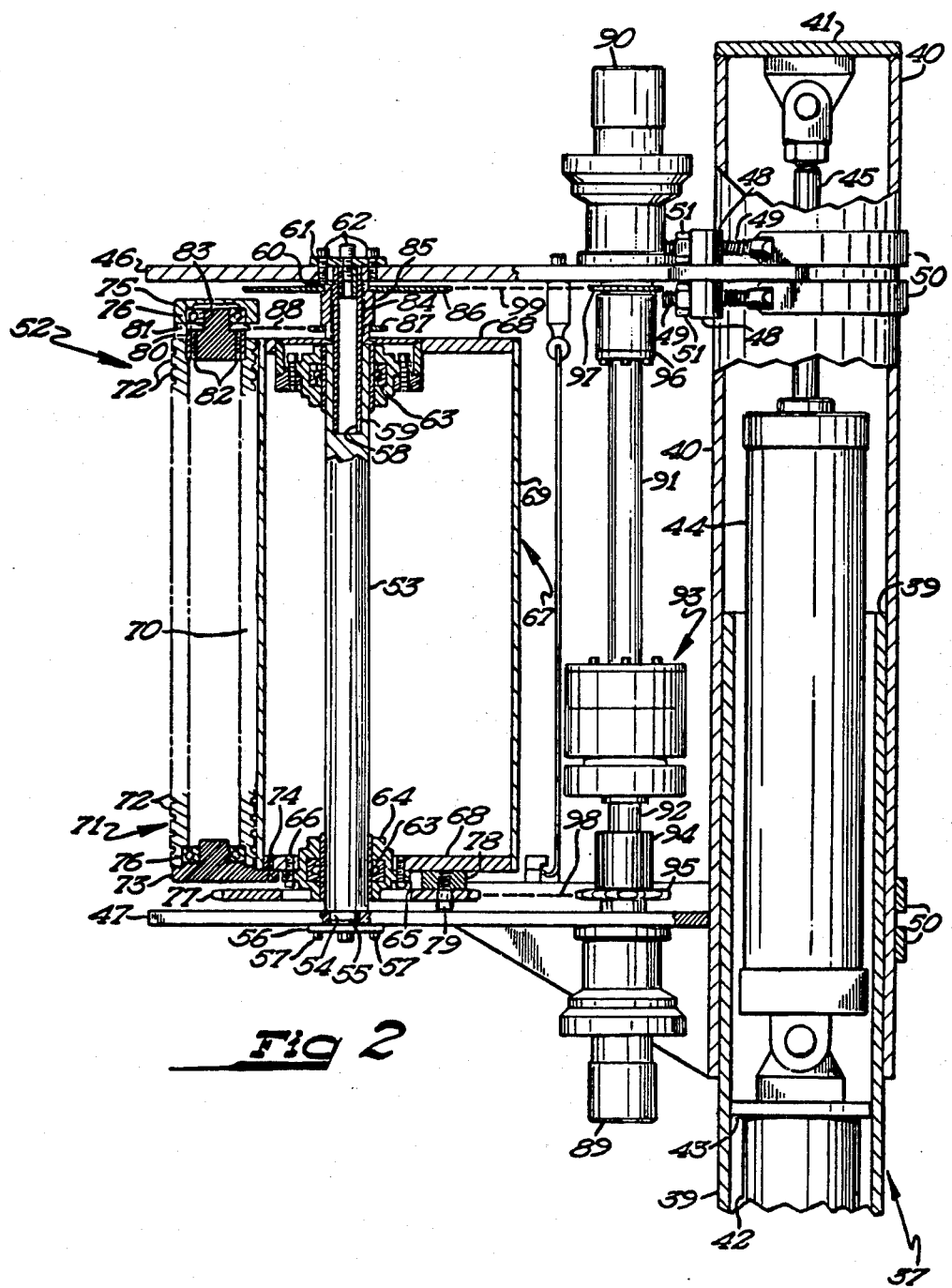
FIG. 2 is a cross-sectional view taken approximately along line 2—2 of FIG. 1 and looking in the direction of the arrows.
Figure 3:
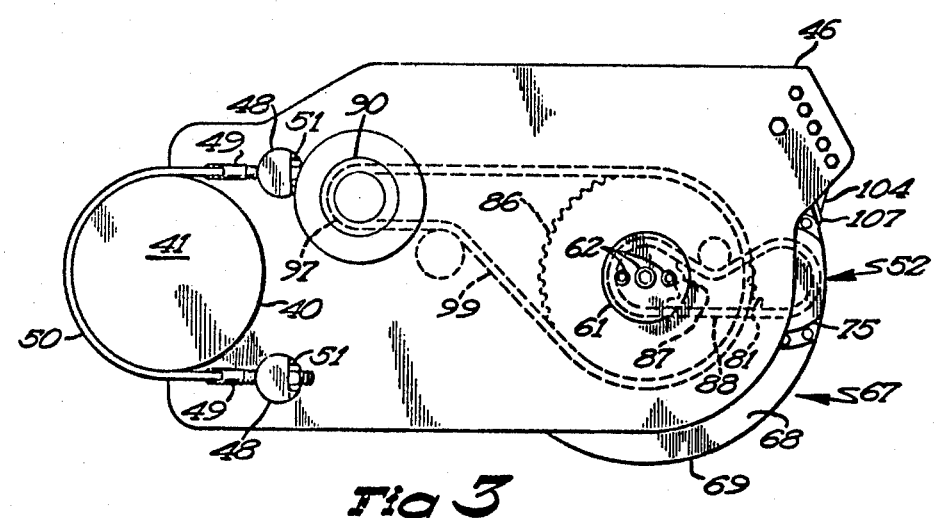
FIG. 3 is a cross-sectional view taken approximately along line 3—3 of FIG. 1 and looking in the direction of the arrows.
Figure 4:
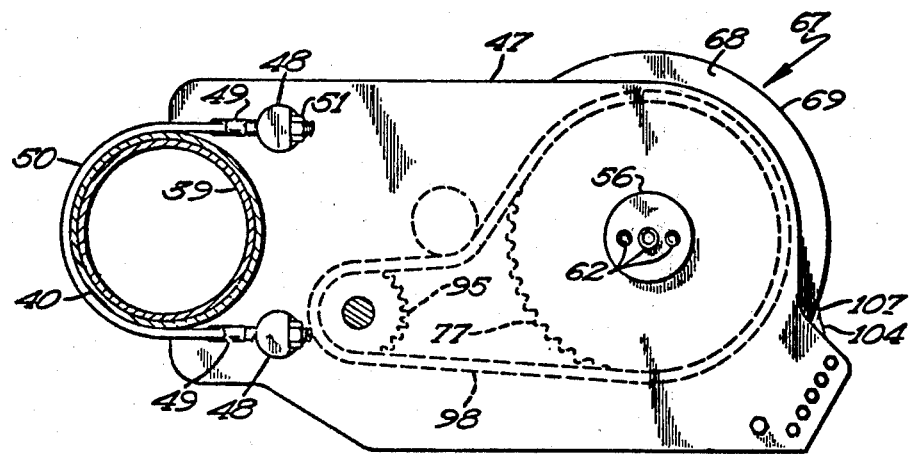
FIG. 4 is a cross-sectional view taken approximately along line 4—4 of FIG. 1 looking in the direction of the arrows.

The upper vertical support member 40 has an upper horizontal support plate 46 secured thereto adjacent the upper end thereof and a lower horizontal support plate 47 secured thereto adjacent the lower end portion thereof. In this respect, it will be noted that each of the support plates 46 and 47 are provided with a pair of spaced apart vertical attachment elements 48 adjacent one side thereof, as best seen in FIGS. 1 and 2. Each of the attachment elements 48 project completely through the associated plate and each has a pair of openings therein for accommodating the threaded bolts 49 which are attached to bands 50. The bands 50 extend around the exterior surface of the upper vertical support member 40. Suitable nuts 51 threadedly engage the ends of the bolts 49 to clamp the support plates on the vertical support 37. It will be noted that each of the support plates 46 and 47 is provided with a recess to accommodate a portion of the circumferential surface of the upper vertical support 40.

A skin removing device 52 is supported on the upper and lower support plates 46 and 47 and includes an elongate vertically disposed shaft 53 which has a reduced lower end portion 55 that projects through an opening 54 in the lower support plate 47. An end plate element 56 is provided and is clamped against the lower surface of the lower plate 47 and by bolts 57, one of which is threaded into the end of the shaft 53. Thus, the shaft 53 is secured at its lower end to the lower plate 47.

The shaft 53 has an axial recess 58 in the upper end thereof which accommodates an upwardly projecting tubular shaft element 59 therein. The upper support plate 46 has an opening therein which receives therein, an internally threaded tubular end element 60 having an outturned radial flange 61 integral therewith. A plurality of bolts 62 clamp the flange 61 to the upper plate, and one of these bolts threadedly engages the internally threadedly tubular end element 60 to thereby clamp the tubular shaft element 59 to the upper support plate 46. In this respect, the tubular shaft element 59 constitutes an upward extension of the shaft 53. Therefore the composite shaft extends between and is fixedly connected to the upper and lower support plates.

Referring again to FIG. 2, it will be seen that a pair of ball bearing mechanisms 63 each engage one end portion of the shaft 53 and each is mounted within a bearing housing 64. Each of the bearing housings 64 is provided with an annular flange 65 through which projects a plurality of bolts 66 which threadedly engage the end plates 68 of a vertically oriented drum 67. The drum 67 also includes a cylindrical portion 69 which is rigidly interconnected to the end plates 68, and the drum 67 is journaled on the shaft 53 for rotation relative thereto.

The drum 67 is provided with a recess 70 in the cylindrical portion 69 thereof which extends throughout the axial extent of the drum, the recess being generally of cylindrical configuration. An elongate, toothed, skin gripping cylinder 71 is positioned in the recess and is provided with teeth 72 throughout its circumference. A lower end plate 73 is secured to the lower end plate 68 of the drum 67 by means of bolts 74. An upper end plate 75 is secured to the upper end plate 68 of the drum 67 by means of bolts and ball bearings 76 are interposed between the toothed cylinders 71 and the end plates to journal the toothed cylinder for rotation relative to the drum 67.

Means are provided for drivingly rotating the drum 67 and for rotating the toothed cylinder 71. The means for driving the drum includes a driven sprocket 77 which is secured to a plurality of connector pads 78 by bolts 79. It will be noted that the connector pads 78 are rigidly connected to the lower end plate 68 and the drum 67. The driven sprocket 77 is horizontally oriented and is positioned above the lower support plate 47. Therefore when the sprocket 77 is rotated the drum 67 will be revolved about an axis defined by the shaft 53. The toothed cylinder 71 has a sprocket mounting member 80 pressed into the upper end thereof and projecting outwardly therefrom, as best seen in FIG. 2. A sprocket 81 is secured to the sprocket mounting member by means of bolts 82. It will be noted that the sprocket mounting member 80 has a reduced end portion 83 which projects into the upper end plate or cap 75 so that the inner race of the ball bearing 76 engages this reduced end portion and is supported on the shoulder defined thereby.

Referring again to FIG. 2, it will be seen that the tubular shaft element 59 has a sleeve bearing 84 positioned concentrically thereon which journals a sprocket sleeve 85 positioned concentrically on the bearing 84. The sprocket sleeve 85 has a large sprocket 86 fixedly secured to the upper end thereof and a smaller sprocket 87 fixedly secured thereto adjacent its lower end. It will be noted that the sprocket 87 is disposed in coplanar relation with the sprocket 81 and a chain 88 is trained about sprockets 81 and 87. It will therefore be seen that when sprocket 86 is revolved, sprocket 87 will also be revolved thereby driving sprocket 87 will also be revolved thereby driving sprocket 81 through chain 88. When this occurs, the toothed cylinder 71 will be revolved relative to the drum 67.

Power means are provided for revolving the drum 67 and the toothed cylinder 71 this means includes a hydraulic motor unit 89 mounted on the lower support plate 47 and depending therefrom, and a hydraulic motor unit 90 mounted on the upper support plate 46 and projecting upwardly therefrom. A shaft 91 and a shaft 92 are both drivingly interrelated to an air-type clutch mechanism 93.

The shaft 92 projects into and is interconnected to a shaft adaptor 94 having a sprocket 95 secured thereto for rotation therewith. The shaft 91 projects into a shaft adaptor 96 which has a sprocket 97 secured thereto for rotation therewith.

At the beginning of the skinning cycle the clutch is in the disengaged position. Hydraulic motor 90 is started thereby rotating the toothed roll through sprockets 97, 86,87 and 81. After the toothed roll has revolved approximately one-half to three-fourths revolution (this can be varied) has a skin flap has been formed, the clutch is engaged and hydraulic motor 89 rotates the drum through sprockets 95 and 77. A hydraulic motor 90 then rotates at the same speed as hydraulic motor 89. This rotation maintains the toothed roll in a stationary position in relation to the drum rotation and hydraulic motor 90 also supplements the power of hydraulic motor 89.

An endless chain 98 is trained about the sprocket 95 and about the sprocket 77 which is secured to the drum 67. It will therefore be seen that when the sprocket 95 is driven, the drum 67 will be rotated. An endless chain 99 is trained about sprocket 97 and about sprocket 86 whereby when sprocket 97 is rotated, sprocket 86 will be driven thereby driving sprocket 87, chain 88 and sprocket 81 to revolve the toothed cylinder 71.

Figure 5:
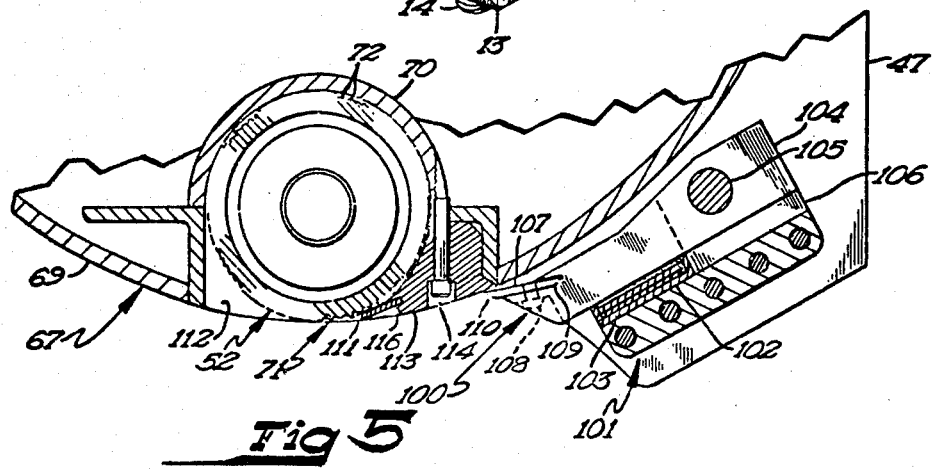
FIG. 5 is a cross-sectional view taken approximately along line 5—5 of FIG. 1 and looking in the direction of the arrows.

Referring now to FIGS. 1 and 5, it will be seen that a skinning blade assembly 100 is provided and includes an elongate generally rectangular shaped vertically disposed support plate 101 which extends between and is rigidly secured to the upper and lower support plates 46 and 47. It will be noted that the support plate 101 is positioned in spaced relation with respect to the exterior surface of the drum 67. The support plate 101 is provided with an elongate substantially straight U-shaped guide member 102 which is secured to one surface thereof and extends substantially throughout the height or length of the support plate 101. The U-shaped guide member 102 has an elongate inflatable pressure member 103 positioned therein, the pressure member being formed of an elastic expandable material and connected to a source of air under pressure.

The blade assembly 100 also includes a plurality of similar, elongate, horizontally oriented blade support fingers 104 each having an opening therein through which projects an elongate pivot shaft 105 which extends through the upper and lower support plate and is secured thereto. A plurality of spacer elements 106 are each positioned between an adjacent pair of support fingers 104, and each spacer element 106 is secured to the support plate 101 by means of a bolt. The spacer elements 106 also have an opening therethrough and the shaft 105 extends through the opening in each of the spacer elements 106. The spacer elements 106 vertically space the blade support fingers from each other.

An elongate substantially straight vertically disposed skinning blade 107 is connected to the support fingers 104 by bolts 108. In this respect, each support finger 104 has a slot 109 therein which receives the blade 107, and the blade is secured to four of the fingers by bolt 108. The blade 107 is provided with a cutting edge 110 which is positioned in close proximity to the exterior surface of the drum 67. It will be noted that the inflatable pressure member 103 engages the support fingers 104 and, when inflated tends to urge the fingers 104 about their pivotal axis defined by the shaft 105 towards the drum 67.

The skin removing apparatus 10 also includes a flap forming blade assembly 111 which is positioned within the recess 112 in the drum 67. The flap forming blade assembly 111 includes an elongate, vertically oriented, blade support member 113 positioned within the recess 112 and being secured to the drum by suitable bolts 114.

An elongate, substantially straight, vertically oriented, flap forming blade 111 is positioned within the recess 112 and is supported in a slot in the blade support member 113 and is retained in place by the set screws 116 which extend through threaded bores in the support member.

The skin removing apparatus also includes a carcass engaging device 126 which is comprised of an elongate vertical support 127 of rectangular cross-sectional configuration and having split clamping rings 128 welded to the lower end thereof for clamping engagement with the longitudinal support member 23 of the carriage device 22. Suitable bolts 129 secure the clamping rings 128 in clamping relation with respect to the carriage 22.

The vertical support 127 is provided with a mounting plate 130 therein adjacent the lower end portion thereof, as best seen in FIG. 1. One end of a double acting hydraulic cylinder 131 is mounted on the mounting plate 130 and projects upwardly therefrom. The hydraulic cylinder 131 is provided with a piston movable therein to which is connected a piston rod 132 which projects upwardly therefrom. The upper end of the piston rod 132 is connected to the inner end of the lower horizontally oriented rectangular support arm 123 which projects through an opening 127a in the vertical support 127. The lower support arm 133 projects outwardly of the vertical support 127 toward the drum 67 and is provided with a front wall 134. A double acting pneumatic cylinder 135 is positioned in the lower support arm 133 and is secured to the front wall 134 thereof and has a piston movable therein. The piston is connected to a piston rod 136 which projects beyond the front wall 134 and has a generally U-shaped carcass engaging yoke 137 affixed to its outer end. It will be seen that extension and retraction of the piston rod 136 shifts the carcass engaging yoke 137 towards and away from the drum 67.

One end of a double acting hydraulic cylinder 138 is connected to the upper end wall 139 of the vertical support 127. The hydraulic cylinder 138 has a piston movable therein to which is connected a piston rod 140 which is extendable and retractable relative to the cylinder. The lower end of the piston rod 140 is connected to the upper rectangular shaped The skinning apparatus also includes an overhead rail 146 which is secured to the longitudinally extending structural I-beam 152 by suitable hangers 146a. The animal carcass, such as the hog carcass H, will be suspended from the overhead rail by trolley 147. The trolley 147 includes a trolley frame having a wheel 149 which is supported upon the rail 146. The trolley is connected to a gambrel 147a by a link 147b. The gambrel 147a pierces the rear legs of the hog and is substantially horizontally oriented when the hog carcass is suspended from the rail.

The skinning apparatus is provided with a movable rail device 150 which permits lateral movement of the carcass while the carcass is suspended from the overhead rail. Referring now to FIGS. 9 through 12, it will be seen that the movable rail device 150 is mounted on an elongate transversely extending structural I-beam 151 and a longitudinally extending structural I-beam 152 which constitutes part of the building in which the apparatus is located. A pair of longitudinally spaced apart elongate, tubular vertical supports 153 are rigidly mounted on the upper surface of the longitudinal I-beam 152 and project upwardly therefrom. A pair of transversely extending longitudinally spaced apart horizontal, structural channels 154 are mounted on the upper ends of the tubular supports and these channels 154 constitute part of the building structure in which the skinning apparatus is located. Each horizontal channel 154 has a pillow bearing 155 mounted thereon in which is journaled an elongate, pivot shaft 156.

The pivot shaft 156 has a frame structure 157 rigidly secured thereto whereby the frame structure is mounted for swinging movement about an axis defined by the pivot shaft 156. Frame structure 157 includes a pair of longitudinally spaced apart rectangular frames 160 each comprised of a pair of vertically spaced apart horizontal transverse frame elements 158 which are ridigly secured to vertical frame elements 159. The rectangular frames 160 are rigidly interconnected together by longitudinal frame element 161.

A pair of elongate, substantially straight vertical frame elements 162 are each rigidly secured to one of the rectangular frames 160 and project upwardly therefrom. In this respect, it will be noted that each vertical frame element 162 is rigidly affixed to the central portion of the uppermost transverse frame element 158 of the associated rectangular frame 160. It will also be noted that each vertical frame elememt 160 is reenforced by a pair of inclined struts 163 which are rigidly affixed to the associated rectangular frame 160. The upper end of each vertical frame element 162 is rigidly secured to the pivot shaft 156 for movement therewith.

A pair of elongate, substantially flat vertical shafts 164 each have one end rigidly affixed to one of the rectangular frames 160 and depend therefrom. In this respect, it will be noted that the rail hangers 164 are secured to the mid-portion of the lower horizontal frame element 158 of the associated rectangular frame 160. The lower end portion of each strap 165 is laterally offset and is secured to an elongate rail section 166 by suitable bolts or the like. It will be noted that the rail 146 has a space or gap therein which is bridged by the rail section 166. Thus, the rail section 166 actually constitutes a part of the overhead rail 146 and is shiftable into and out of longitudinal alignment with the rail 146.

Means are provided for preventing a carcass supporting trolley 147 from falling from the rail 146 when the rail section 166 is shifted out of aligned relation with the rail 146. An elongate, substantially straight cylindrical shaft 168 is journaled in a pair of bearings 169, each bearing being supported by a bracket 167 which is secured to a strap 146a secured to the lower surface of the I-beam 152 and supporting the rail 146. A pair of elongate, arcuate stop members 170 each have one end thereof secured to the shaft 168 and are movable therewith.

The stop members 170 are vertically swingable about an axis defined by the shaft 168 and means are provided for shifting the stop members into and out of obstructing relation with respect to the upper surface of the rail 146 and the rail section 166. This means includes a pneumatic cylinder 172 which is supported by a bracket 171 secured to the I-beam 152. The pneumatic cylinder 172 is provided with a piston rod 173 which is connected by flexible link 174 to a U-shaped element 175 secured to the upper surface of one of the stop members 170.

It will be seen that when the piston rod 173 is retracted, the stop members 170 will be swung vertically upwardly and away from the rail 146 and the rail section 166. However, when the piston rod 173 is extended, the stop members will engage the upper surface of the rail 146 and the rail section 166 and will obstruct movement of a carcass supporting trolley along the rail and rail section. In this respect, it will be noted that the stop members 170 engage the upper surface of the rail 146 and the rail section 166 at the juncture point between the rail section and rails. Because of its arcuate configuration, the stop members when in the lowered obstructing position maintain contact with the rail section 166 even though the latter is swung transversely.

During operation of the apparatus, the skin will be removed from the rear legs L of the hog carcass and the gambrel will pierce the rear legs of the carcass and will be attached to the trolley 147 to suspend the carcass from the rail 146. The skin will be removed from the ham portion M of the rear legs by a suitable mechanical skinning medium. The carcass H will then be moved to the next station and a cut C will be made in the skin completely around the torso of the animal just rearwardly of the forelegs of the carcass as best seen in FIG. 6. The carcass will then be advanced along the rail 146 until it moves upon the rail section 166. When the carcass is approximately midway of the rail section 166, the pneumatic cylinder 172 will be actuated to extend the piston rod 173 to thereby urge the stop members 170 into engaging relation with the upper surface of the rail 146 and the rail section 166. The stop members will prevent accidental disengagement of the carcass supporting trolleys from the rail 146 and from the rail section 166.

When a carcass is supported on the rail section 166, the carcass will be positioned between the skin removing device 52 and the carcass engaging device 126. The double acting pneumatic cylinders 138 and 143 will be operated to extend the piston rods thereof so that the yokes 137 and 145 engage the carcass and urge the carcass against the drum 67.

Figure 7:
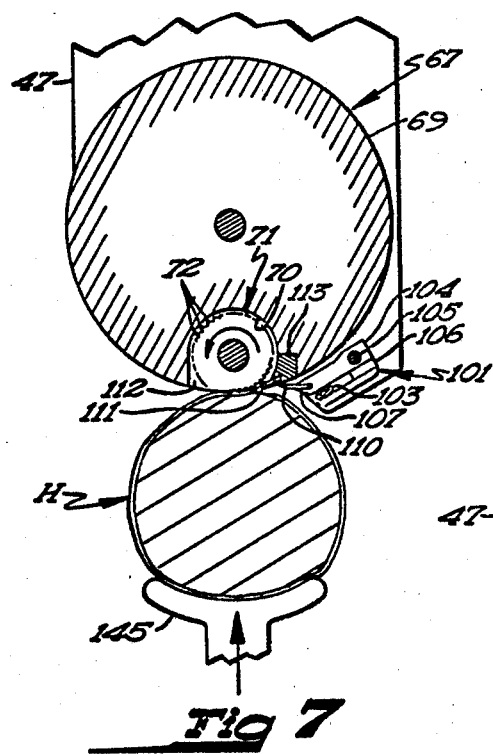
FIG. 7 is a diagrammatic cross-sectional view illustrating the formation of a skin flap.

It is pointed out that the support arms 133 and 141 will have been adjusted to the proper height and the vertical support 37 will have also been adjusted. Referring now to FIG. 7, it will be seen that when the hog carcass H is urged against the drum 67 by the yokes 137 and 145, the surface of the carcass will be positioned against the toothed cylinder 71. The toothed cylinder 71 at the beginning of the skin moving cycle will be positioned opposite the carcass engaging device 126 as best seen in FIG. 7.

Figure 8:
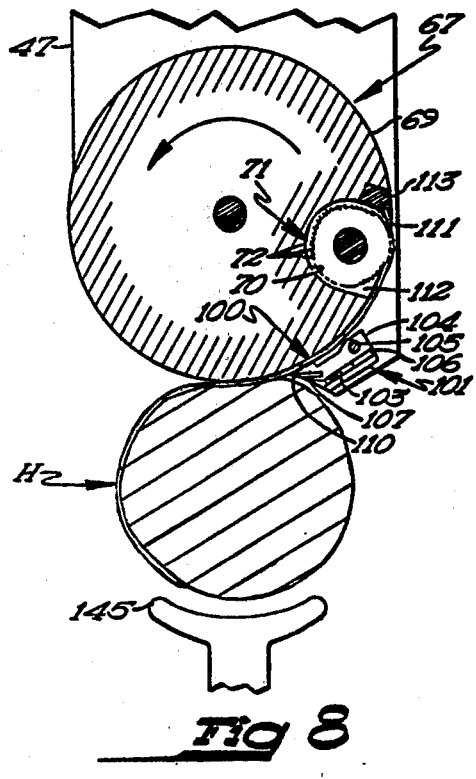
FIG. 8 is a diagrammatic cross-sectional view similar to FIG. 7 and illustrating the manner in which the skin is removed from the animal carcass.

The toothed cylinder will be revolved in the direction indicated by the arrows in FIG. 7 and will urge the skin against the flap forming blade 11 so that a cut will be made in the skin throughout the length of the torso portion of the carcass. The cut edge of the skin will then be gripped by the toothed cylinder and wound thereabout. The toothed cylinder will be revolved through an arc of approximately 180 degrees to the position seen in FIG. 8. During rotation of the toothed cylinder through the arc of approximately 180 degrees, the drum 67 will remain stationary. The drive to the toothed cylinder will then be engaged to the drum drive to the drum from its power source will be completed. This sequencing of the operation of the toothed cylinder and the drum is controlled by the clutch device 93. After the toothed cylinder is stopped, the inflatable member 103 for the skinning blade 107 will be inflated to urge the skinning blade closely adjacent the periphery of the drum. As the drum 67 is rotated in the direction indicated by the arrow in FIG. 8, the skin will be progressively removed from the torso portion of the animal carcass. When the drum 67 has revolved through an arc of 360 degrees the skin will be completely removed from the hog carcass.

The separated skin will still be gripped by the toothed cylinder 71 and it is then necessary to revolve the toothed cylinder in a reversed direction through an arc of approximately 180 degrees to release the flap. The skin will drop upon the conveyor belt 35 and will be conveyed away and collected. It is pointed out that after the flap portion of the skin is wound partially about the toothed cylinder 71, the pneumatic cylinders 135 and 143 will have been retracted. The carcass is held against the drum as a result of the flap portion of the skin being wound about the toothed cylinder 71.

As soon as the skin is removed from the torso portion of the animal, the trolley supported torso will tend to swing away from the drum to a position wherein the rail section 166 is aligned with the rail 146. The pneumatic cylinders 177 will be actuated to extend the piston rods 178 thereof to center the frame structure 157 and to align the rail section 166 with the rail 146. These pneumatic cylinders will then be retracted and the pneumatic cylinder 172 will be actuated to retract the piston rod 173. The stop members 170 will be swung away from obstructing relation with respect to the rail section 166 and the rail 146 and thereby permit the skinned carcass to be moved along the rail 146 and to permit the next carcass to be skinned to be moved into position for the skinning operation.

The hog carcass will be moved to the next adjacent section and the shoulder and head portion of the carcass will then be skinned. It has been found that when skin is removed from a hog carcass in accordance with the present novel apparatus, the skin will have very little fat remaining thereon, thus requiring little, if any, additional treatment of the skin before it is used in some other process, such as the preparation of gelatin. The present method also eliminates the need for scalding and singeing which are preliminary steps required when the hot is butchered into primal cuts without removing the skin.

It will therefore be seen that we have provided a novel method and apparatus for removing the torso portion from the carcass of animals, such as hogs, which is more effective than any heretofore known comparable apparatus and method.

What is claimed is:

1. An apparatus for removing the torso portion of the skin from the carcass of an animal such as a hog, comprising:
    a revolvable cylindrical drum,
    drive means drivingly connected with said drum for revolving the same,
    a skinning blade positioned in close proximity to said drum,
    a flap forming blade on said drum making a longitudinal cut in the torso portion of the skin of the carcass when the carcass is urged against said drum, gripping means on said drum engaging a longitudinal cut edge of the skin pulling a portion of the skin against the flap forming blade to form and grip the flap of the skin, whereby when said drum is revolved, the skinning blade will progressively remove the torso portion of the skin from the carcass,
    and shiftable carcass engaging means being shiftable towards and away from said drum, said carcass engaging means when shifted towards said drum and holding the carcass against the gripping means until a skin flap is gripped by the latter.

2. The apparatus as defined in claim 1 wherein said gripping means are revolvable relative to said drum and when revolved in one direction progressively pulling a longitudinal cut edge portion of the skin against said flap forming blade means.

3. The apparatus defined in claim 2 wherein said gripping means comprises a toothed cylinder which grips and retains the torso portion of the skin after the skin is removed from the carcass, said toothed cylinder releasing the skin when toothed cylinder is revolved in the opposite direction.

4. The apparatus as defined in claim 1 wherein said flap forming blade is mounted on said drum in close proximity to said gripping means.

5. The apparatus as defined in claim 1 wherein said skinning blade is shiftable relative to said drum between operative and inoperative positions, said skinning blade when in the operative position being positioned closely adjacent the drum and cutting the skin from the carcass, and when in the inoperative position being disposed out of skin engaging relation with respect to the carcass to be skinned, and means for shifting said skinning blade between operative and inoperative positions.

6. The apparatus as defined in claim 5 wherein said means for shifting said skinning blade comprises an inflatable pressure member.

7. The apparatus as defined in claim 1 wherein said drum is vertically oriented for rotation about a substantially vertical axis.

8. The apparatus as defined in claim 1 wherein said drum and said carcass engaging means are mounted on a carriage, a base including track means supporting said carriage for movement along said track means.

9. The apparatus as defined in claim 3 wherein said toothed cylinder is vertically oriented and is revolvable about a substantially vertical axis.

10. The apparatus as defined in claim 1 wherein said carcass engaging means includes a pair of carcass engaging generally U-shaped yokes.

11. A method of removing the torso portion of an animal skin from an animal carcass, such as a hog carcass, comprising:
    removing the skin from the rear legs of the carcass,
    vertically suspending the carcass by its rear legs from an overhead support, making a cut in the skin of the torso completely around the carcass just rearwardly of the front legs of the animal, shifting and holding the carcass against a revolvable cylindrical supporting medium, mechanically cutting the torso portion of the skin of the animal longitudinally of the carcass while the latter is held against said cylindrical supporting means, engaging and gripping the longitudinally cut edge of the torso portion of skin by a revolvable gripping medium on said cylindrical supporting medium, and urging the flap forming blade to form a skin flap, partially winding the flap about the gripping medium when the latter is revolved in one direction, and revolving said cylindrical supporting medium to an arc of approximately 360 degrees against a skinning blade to progressively remove the torso portion of the animal skin from the carcass.

12. The method as defined in claim 11 and revolving the gripping medium in an opposite direction to release the skin from the cylindrical support medium.

13. The apparatus as defined in claim 1 and overhead rail means for suspending carcasses to be skinned from said overhead rail, a movable rail device positioned adjacent said drum and carcass engaging means, said movable rail device including an elongate, straight rail section shiftable towards and away from said drum between aligned and offset positions, said rail section when in the aligned position having its ends aligned with the overhead rail, and when in the offset position being shifted laterally towards the drum.

14. An apparatus for removing the torso portion of the skin from the carcass of an animal such as a hog, comprising:

a revolvable cylindrical drum, drive means drivingly connected with said drum for revolving the same, an elongate skinning blade extending longitudinally of and positioned in close proximity to said drum, a flap forming blade on said drum and extending longitudinally thereof and making a longitudinal cut in the torso portion of the carcass when the carcass is positioned against said drum, gripping means on said drum engaging a longitudinal cut edge of the skin pulling a portion of the skin against the flap forming blade to form and grip the flap of the skin, whereby when said drum is revolved, the skinning blade will progressively remove the torso portion of the skin from the carcass.

15. The apparatus as defined in claim 14 wherein said gripping means are revolvable relative to said drum and when revolved in one direction progressively pulling a longitudinal cut edge portion of the skin against said flap forming blade means.

16. The apparatus defined in claim 15 wherein said gripping means comprises a toothed cylinder which grips and retains the torso portion of the skin after the skin is removed from the carcass, said toothed cylinder releasing the skin when toothed cylinder is revolved in the opposite direction.

17. The apparatus as defined in claim 14 wherein said flap forming blade is mounted on said drum in close proximity to said gripping means.

* * * * *